United States Patent
Wang et al.

(10) Patent No.: US 7,050,879 B1
(45) Date of Patent: May 23, 2006

(54) ADJUSTING A SAMPLING PROTOCOL IN AN ADAPTIVE CONTROL PROCESS

(75) Inventors: Jin Wang, Austin, TX (US); Gregory A. Cherry, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 418 days.

(21) Appl. No.: 10/406,463

(22) Filed: Apr. 3, 2003

(51) Int. Cl.
*G06F 19/00* (2006.01)

(52) U.S. Cl. .................... 700/121; 700/109; 438/14

(58) Field of Classification Search ............... 700/175, 700/108, 121, 110, 109, 33, 44; 702/84, 702/181, 83; 257/521–525; 451/5, 287; 219/121.51; 438/14, 7
See application file for complete search history.

(56) References Cited

U.S. PATENT DOCUMENTS

| | | | |
|---|---|---|---|
| 2004/0173581 A1* | 9/2004 | Udo et al. | 219/121.51 |
| 2005/0033467 A1* | 2/2005 | Purdy | 700/109 |
| 2005/0107971 A1* | 5/2005 | Ritzdorf et al. | 702/84 |

* cited by examiner

*Primary Examiner*—Kidest Bahta
(74) *Attorney, Agent, or Firm*—Williams, Morgan & Amerson, LLP

(57) ABSTRACT

A method and an apparatus are provided for adjusting a sampling protocol in an adaptive control process. The method comprises determining a performance value based on a measurement associated with at least one or more previously processed workpieces, adjusting a sampling protocol for one or more processed workpieces based on the determined performance value, and measuring the one or more processed workpieces according to the sampling protocol to provide one or more measurements. The method further comprises adjusting at least one of a process model and a control parameter based on at least a portion of the one or more measurements.

27 Claims, 3 Drawing Sheets

ADJUSTING A SAMPLING PROTOCOL IN AN ADAPTIVE CONTROL PROCESS

BACKGROUND OF THE INVENTION

1. Field of the Invention

This invention relates generally to an industrial process, and, more particularly, to adjusting a sampling protocol of processed workpieces in an adaptive semiconductor process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools, etc. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

Run-to-run control in semiconductor manufacturing is a type of batch control, where a batch may be as small as one wafer or as large as several lots of wafers. The standard output of a run-to-run controller is a process recipe. This recipe defines the set points for "low-level" controllers built into the processing tool. The process recipe is generally calculated based on an estimated "process" state (e.g., the processing tool state, wafer state, etc.) and a process model that is substantially representative of the operation of the process. The "process" state is typically not measured directly but rather estimated based on the measurements from previously processed wafers. Based on at least the process model and the estimated process state, the run-to-run controller supervises the processing tool by specifying required values for process variables such as temperature, pressure, flow, and process time. The processing tool initiates the activities necessary to maintain these variables at the requested values.

In an adaptive process, the process model or parameters used to determine the next recipe may be adjusted, as desired, based on metrology data associated with previously processed workpieces to bring the actual process results closer to the target results. It may be desirable to adjust the process model or parameters, for example, if the controller is unable to achieve the desired results because of disturbance or process changes. Because the process model or parameters are adjusted based on the metrology data, the amount of metrology data that is available may affect how reliably the process model/parameters may be adjusted. Thus, if a system employing a fixed sampling frequency plan measures a fixed number of wafers, then the amount of metrology data that is available also remains fixed. In a fixed sampling frequency plan, for example, only one out of every five processed wafers may be measured because of time and cost concerns. A fixed sampling frequency plan thus may not offer an efficient or flexible plan for adjusting the process model or parameters to achieve the desired process results.

The present invention is directed to overcoming, or at least reducing the effects of, one or more of the problems set forth above.

SUMMARY OF THE INVENTION

In one embodiment of the present invention, a method is provided for adjusting a sampling protocol in an adaptive control process. The method comprises determining a performance value based on a measurement associated with at least one or more previously processed workpieces, adjusting a sampling protocol for one or more processed workpieces based on the determined performance value, and measuring the one or more processed workpieces according to the sampling protocol to provide one or more measurements. The method further comprises adjusting at least one of a process model and a control parameter based on at least a portion of the one or more measurements.

In another embodiment of the present invention, an apparatus is provided for adjusting a sampling protocol in an adaptive control process. The apparatus comprises an interface communicatively coupled to a control unit. The interface is adapted to receive a measurement associated with at least one or more previously processed workpieces. The control unit is adapted to determine a performance value based on the measurement associated with at least one or more of the previously processed workpieces, adjust a sampling protocol for one or more processed workpieces based on the determined performance value, and receive metrology data comprising measurements of the one or more processed workpieces according to the sampling protocol. The control unit is further adapted to adjust at least one of a process model and a control parameter based on at least a portion of the metrology data.

In a further embodiment of the present invention, an article comprising one or more machine-readable storage media containing instructions is provided for adjusting a sampling protocol in an adaptive control process. The one or more instructions, when executed, enable the processor to determine a performance value based on a measurement associated with at least one or more previously processed workpieces, adjust a sampling protocol for one or more processed workpieces based on the determined performance value, and measure the one or more processed workpieces according to the adjusted sampling protocol to provide one or more measurements. The processor is further enabled to adjust at least one of a process model and a control parameter based on at least a portion of the one or more measurements.

In a further embodiment of the present invention, a system is provided adjusting a sampling protocol in an adaptive control process. The system comprises a dispatch module and a controller. The controller is adapted to determine a performance value based on a measurement associated with at least one or more previously processed workpieces, adjust a sampling protocol of the dispatch module for one or more processed workpieces based on the determined performance value, and measure the one or more processed workpieces according to the adjusted sampling protocol to provide one or more measurements. The controller is further adapted to adjust at least one of a process model and a control parameter based on at least a portion of the one or more measurements.

BRIEF DESCRIPTION OF THE DRAWINGS

The invention may be understood by reference to the following description taken in conjunction with the accompanying drawings, in which like reference numerals identify like elements, and in which.

Figure 1:
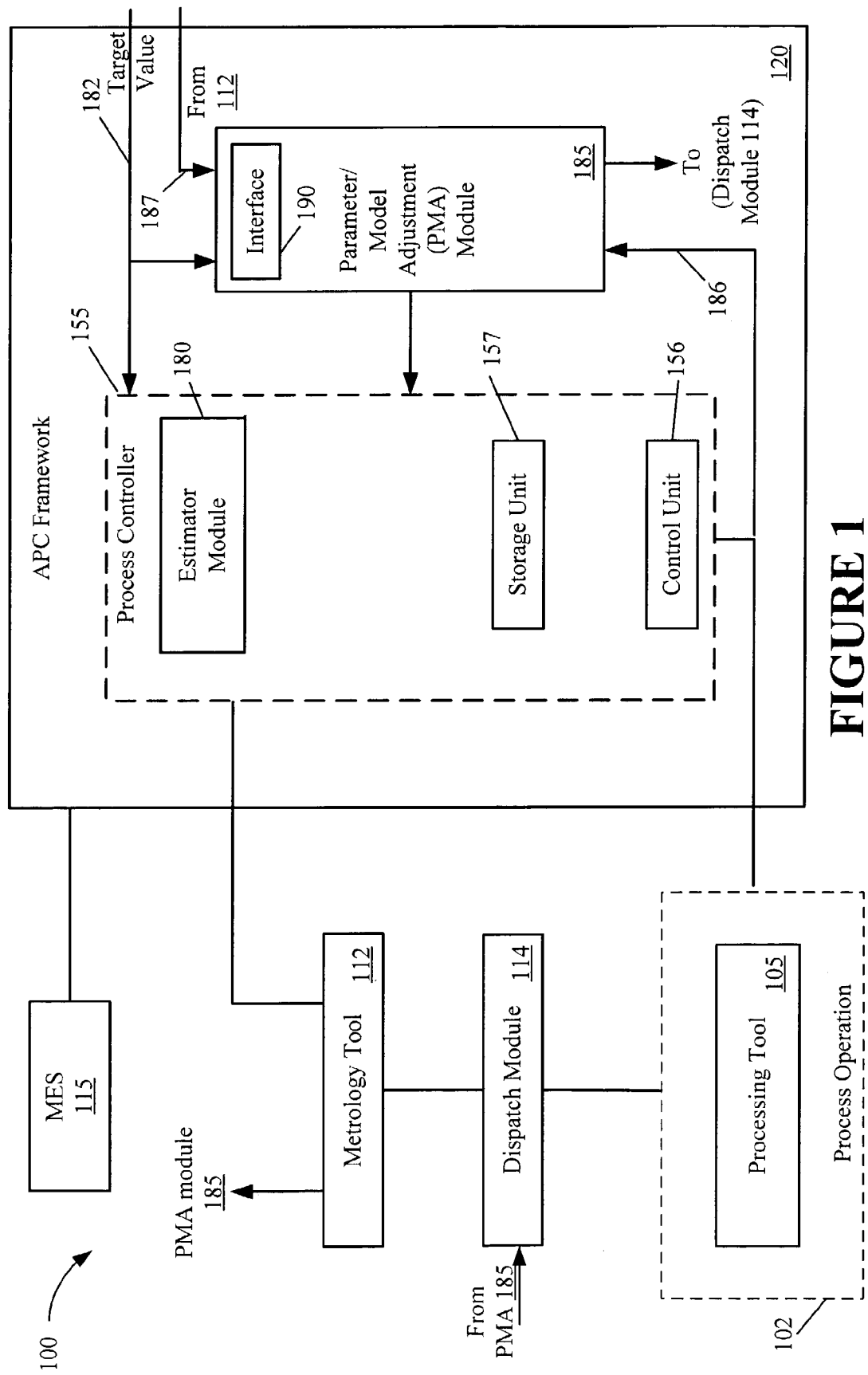
FIG. 1 illustrates a block diagram of an industrial system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a system 100 is illustrated, in accordance with one embodiment of the present invention. The system 100, in the illustrated embodiment, may perform at least one process operation 102, which may be an industrial process, such as a semiconductor fabrication process, a photographic process, a chemical process, or any other process in which the process state(s) or process output may drift with time.

In the system 100, the process operation 102 may be performed using one or more processing tools 105. Generally, the particular type of process operation 102 that is performed, and the type of processing tool(s) 105 employed in that process operation 102, depends on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. Examples of the process operation 102 may be an etch process, deposition process, chemical mechanical planarization (CMP), and the like. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like.

In the system 100 of FIG. 1, the process operation 102 may be performed using one or more processing tools 105. The system 100 may include one or more metrology tools 112 for measuring one or more of a variety of aspects of the workpieces (e.g., wafers) that are processed in the process operation 102. The metrology tool 112, in one embodiment, may be capable of measuring aspects of the workpieces off-line, in-line, in situ or a combination thereof. In the illustrated embodiment, a dispatch module 114 indicates and/or identifies the number of workpieces that are provided to the metrology tool 112 for measurements.

In accordance with one or more embodiments of the present invention, and as is described in greater detail below, the dispatch module 114 adjusts the measurement frequency of the processed workpieces based on a value of a control performance index. The control performance index, in one embodiment, represents the amount of deviation or difference between the results of the processed workpiece(s) and the target value(s) (i.e., the difference between the actual process result(s) and the expected result(s)). Depending on the value of the control performance index, the dispatch module 114 may increase the sampling frequency, decrease the sampling frequency, or leave it unchanged. As utilized herein, adjusting the "sampling frequency" may include increasing/decreasing the number of workpieces (e.g., wafers) whose output characteristics are measured or it may include increasing/decreasing the number of measurements taken from a given workpiece or workpieces or it may include both or it may include altering the types of measurements taken from a given workpiece or workpieces.

The manufacturing system 100 may include a manufacturing execution system (MES) 115 that is coupled to the APC framework 120. The manufacturing execution system 115 may, for example, determine the processes that are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

The APC framework 120 includes at least one process controller 155 that, through a feedback or feedforward process, aids the processing tool 105 towards performing a desired process to thereby achieve a desired result. The process controller 155 in the illustrated embodiment includes a control unit 156, a storage unit 157, and a process model that is storable in the storage unit 157. The process controller 155, based at least on an input from an estimator module 180 and an input target value from line 182, uses a process model to determine the next control move for the processing tool 105. The particular control actions taken by the process controller 155 depend on the particular processes performed by the processing tool 105, and the output from the estimator module 180.

In an adaptive process, the process model (or parameter(s)) employed by the process controller 155 may be adjusted if the process results are not within an acceptable range of the target value. The process results may deviate from the target value for a variety of reasons, including, but not limited to, a presence of a disturbance or a change in the process. In the illustrated embodiment, the adjustment to the process model or parameter(s) is performed by a parameter/model adjustment (PMA) module 185. As shown, in the illustrated embodiment, the PMA module 185 receives three input values and provides two output values. The three inputs include the target value, a control move value, and a measurement value received from lines 182, 186, 187, respectively. The PMA module 185 delivers the process model or parameters (which may have been adjusted) to the process controller 155 and also delivers a sample signal to the dispatch module 114 to adjust the sampling protocol. The PMA module 185, in one embodiment, may include one or more interface units 190 to communicate with various components of the system 100.

The process model 158 employed by the processor controller 155 may be a relatively simple equation-based model (e.g., linear, exponential, weighted average, etc.) or a more complex model, such as a neural network model, principal component analysis (PCA) model, partial least squares projection/latent structures (PLS) model, or the like. The specific implementation of the process model 158 may vary depending on the modeling techniques selected and the process being controlled.

The process controller 155, in one embodiment, maintains incoming "state" information associated with the process operation 102, where the "state" information may be based at least in part on the characteristics (i.e., wafer state data) of the wafer selected for gathering metrology data and/or state information known about the controlled processing tool 105 (i.e., tool state data). The phrase "process state" is used herein to denote the "workpiece state" and/or the "processing tool state."

The estimator module 180 estimates the next tool state of the processing tool 105 (or the next processing state) based on metrology data associated with a previously processed workpiece and a previously estimated state. The phrase "next tool state," as utilized herein, refers to the state of the processing tool 105 before the next batch of workpieces is processed. Based on the estimated next tool state, the process controller 155 generates the next recipe or control move for the processing tool 105. For example, in the context of an etching process, the estimator module 180 estimates an etch rate of the processing tool 105 based on the received metrology data (e.g., etch depth), and the process controller 155 then uses the estimated etch rate to determine an etch time (i.e., recipe) that the processing tool 105 should use to etch the next workpiece (e.g., wafer).

In the illustrated embodiment, the process controller 155 is computer programmed with software to implement the functions described. However, as will be appreciated by those of ordinary skill in the art, a hardware controller designed to implement the particular functions may also be used. Moreover, the functions performed by the process controller 155, as described herein, may be performed by multiple controller devices distributed throughout a system. Additionally, the process controller 155 may be a stand-alone controller, resident in the processing tool 105, or part of a system controlling operations in an integrated circuit manufacturing facility. The term "module," as utilized herein, may be implemented in software, hardware, or any combination thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

It should be understood that the illustrated components shown in the block diagram of the system 100 in FIG. 1 are illustrative only, and that, in alternative embodiments, additional or fewer components may be utilized without deviating from the spirit or scope of the invention. As an example, in one embodiment, the various components of the system 100 may communicate with each other without the APC framework 120. As an additional example, in one embodiment, the processing tool 105, metrology tool 112, and/or MES 115 may each interface with the APC framework 120 through an associated equipment interface (not shown). Additionally, it should be noted that although various components, such as the dispatch module 114 of the system 100 of FIG. 1 are shown as stand-alone components, in alternative embodiments, such components may be integrated with other components of the system 100.

Figure 2:
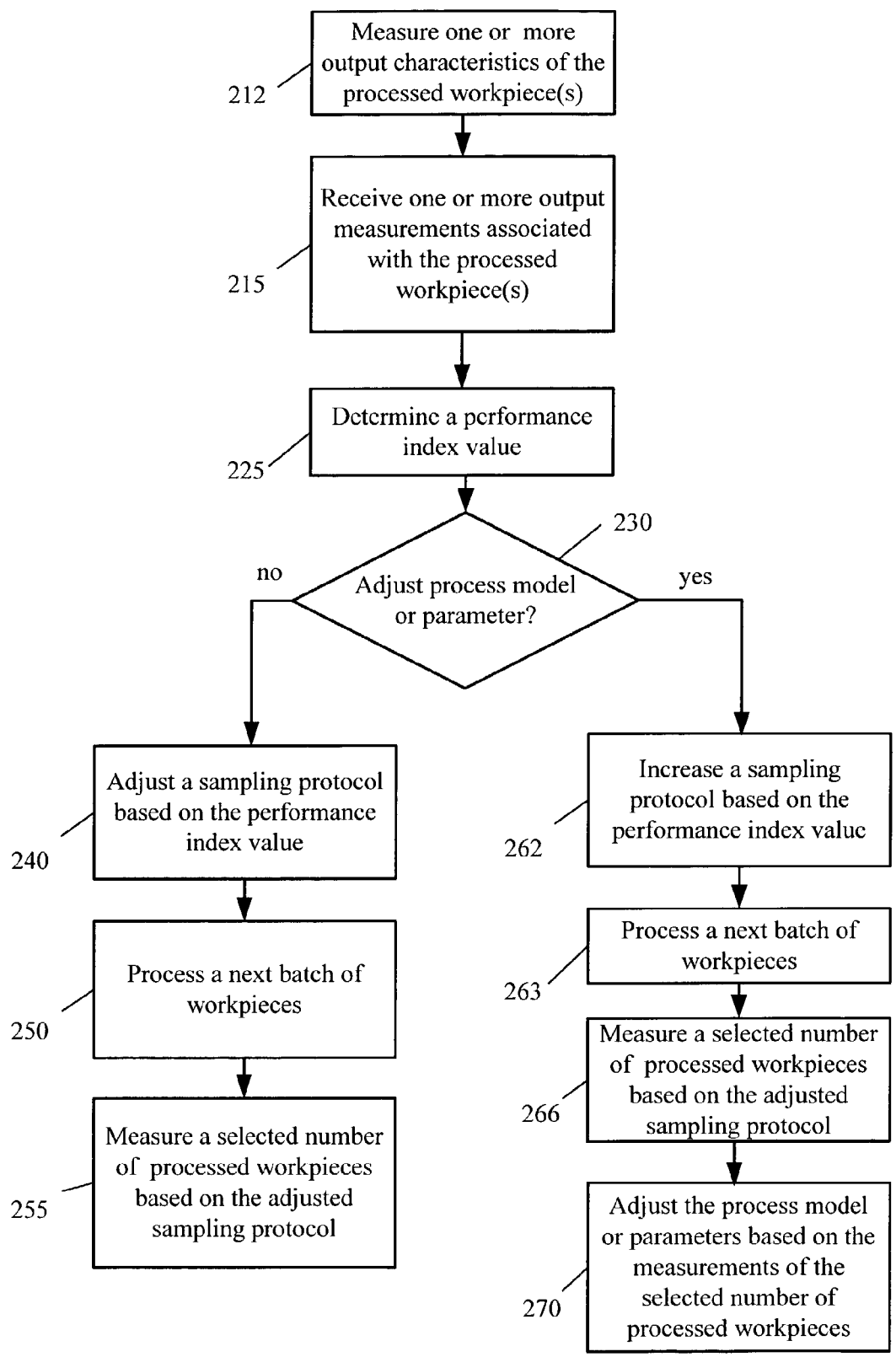
FIG. 2 illustrates a flow diagram of a method that may be implemented in the industrial system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. The method of FIG. 2 illustrates the exemplary steps performed in association with a given process run. These steps may be repeated as desired for each process run.

In the manufacturing system 100, after (or as) a first batch of workpieces are processed by the processing tool 105, the metrology tool 112 (or an in-situ metrology tool) measures (at 212) one or more output characteristics of the processed workpiece. In the context of an etch process, the metrology data may, for example, include the critical dimension, profile and/or etch depth of the features formed on the processed wafer. In the illustrated embodiment of FIG. 1, the metrology data is provided to and received (at 215) by the estimator module 180 of the process controller 155 and the PMA module 185.

The PMA module 185 determines (at 225) a performance index, which, in one embodiment, represents the amount of deviation or difference between the results of the processed workpiece(s) and the target value(s) (i.e., the difference between the actual process result(s) and the expected result(s)). Thus, the performance index, in one embodiment, may be indicative of how close the process result(s) is/are to the target value(s). For example, a relatively large performance index may indicate an occurrence of a larger-than-expected deviation in the process result, which may require the PMA module 185 to adjust the process model (or parameters) to bring the process result closer inline with the target result.

In one embodiment, the performance index may be calculated by determining the difference between a measurement represented by the metrology data (received in block 215) and the target value provided on the line 182 (see FIG. 1). If more than one performance index is calculated (one for each measured workpiece, for example), then, in one embodiment, the plurality of calculated index values may be combined (e.g., averaged) to arrive at a composite value. The difference may then be determined between the composite value and the target value to ascertain the performance index (at 225). In an alternative embodiment, each of the plurality of performance indices may be considered individually rather than collectively.

The PMA module 185 determines (at 230) if it is desirable to adjust a process model and/or process parameters. In one embodiment, this may be determined by comparing the performance index value to a preselected threshold value. If, for example, the performance index is greater than the preselected threshold value (i.e., an indication of a larger-than-desired deviation in the actual results from the expected results), then it may be desirable to adjust the process model or parameter(s). If the performance index is less than or equal to the preselected threshold value, then a process model (or parameters) adjustment may not be desired because the process may be operating within an acceptable range.

Assuming that a process model (or parameter) adjustment is not desired (at 230), then, in one embodiment, the PMA module 185 adjusts a sampling protocol (at 240) of the dispatch module 114 based on the performance index. Adjusting the sampling protocol (at 240) may include adjusting the sampling frequency of the processed workpieces that are to be measured, a number of features formed on the processed workpieces that are to be measured, and/or a type of features that are to be measured.

Figure 3:
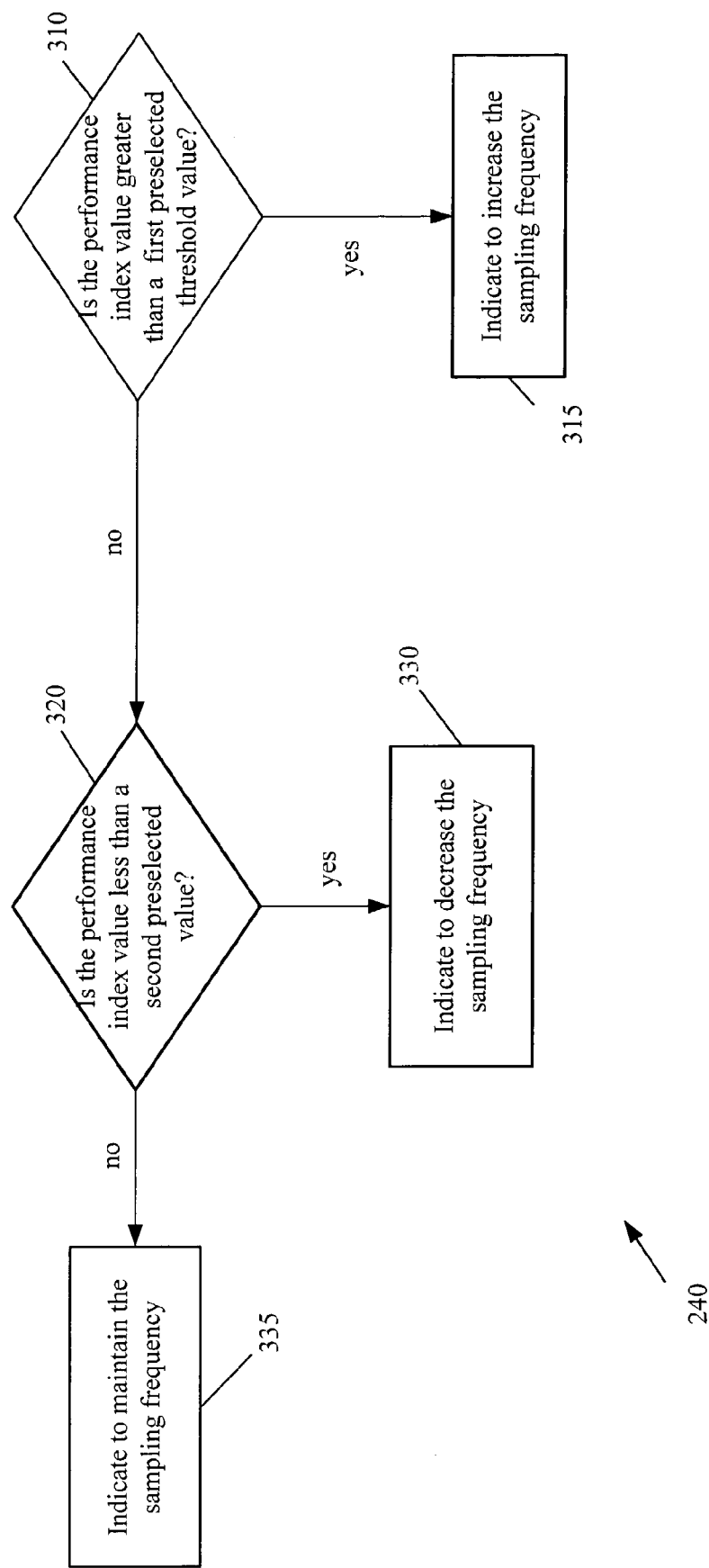
FIG. 3 illustrates a flow diagram of a method of adjusting the sampling protocol of processed workpieces in accordance with one embodiment of the present invention.

In one embodiment, the sampling protocol may be adjusted (at 240) by indicating to the dispatch module 114 to increase or decrease the number (or type) of sample measurements that are desired from the processed workpieces. In one embodiment, based on the performance index value, it may be determined that no adjustment to the sampling frequency is desired (at 240). If no changes to the sampling frequency are desired, then the PMA module 185 may indicate as such to the dispatch module 114 or, alternatively, provide no indication to the dispatch module 114, thus signifying that no change is desired to the sampling frequency. One embodiment of the act of adjusting the sampling protocol (at 240) is illustrated in FIG. 3, which is described later.

In FIG. 2, the processing tool 105 processes (at 250) a next batch of workpieces, and the metrology tool 112 measures (at 255) a selected number of processed workpieces based on the adjusted sampling protocol (at 240). Thus, for example, if the PMA module 185 increases the sampling frequency (at 240), the metrology tool 112 may take more measurements than were taken during earlier process run(s). The metrology tool 112 may take more measurements, for example, by increasing the number of processed workpieces that are sampled, increasing the number of features of the processed workpieces that are measured, or a combination thereof. In other instances, as explained above, the metrology tool 112 may measure fewer processed workpieces than, for example, the previous process run(s). It should be understood that measuring the processed workpieces may comprise measuring one or more features or output characteristics (e.g., deposition thickness, etch depth, critical dimensions) of the processed workpieces.

Assuming that a process model (or parameter) adjustment is desired (at 230), then, in one embodiment, the PMA module 185 increases a sampling protocol (at 262) of the dispatch module 114 based on the performance index. The processing tool 105 processes (at 263) a next batch of workpieces, and the metrology tool 112 measures (at 266) a selected number of processed workpieces based on the increased sampling protocol (at 262).

The PMA module 185 adjusts (at 270) the process model or parameter(s) utilized by the process controller 155 based on the measurements (at 266) of the selected number of processed workpieces, as indicated above, are measured based on the increased sampling protocol (see block 262). Increasing the number measurements of the selected number of processed workpieces, for example, means that more sample measurements (relative to the previous run(s)) are available to the PMA module 185 to make the desired adjustments (at 260) to the process model or parameter(s).

Having more sample measurements enables the PMA module 185 to more accurately adjust the process model or parameter(s) to control the process operation 102 to achieve the desired results. The nature of the adjustment made to the process model or parameters(s) may vary depending on implementation. For example, assume the process controller 155 is a PID (proportional-integral-derivative) controller, i.e., the transfer function of the controller is $$G(s) = \frac{U(s)}{\tilde{Y}(s)} = K_1 + K_2 s + \frac{K_3}{s},$$

where u is the control move, $\tilde{y}=y-\hat{y}$ is the difference between the process output (y) and the process model predicted output ($\hat{y}$). $K_1$, $K_2$, and $K_3$ are controller parameters. If an adjustment to the parameters (e.g., "$K_1$, $K_2$, and $K_3$") of the controller model is desired, which can be done by solving an optimization problem, then it may be useful to have additional measurements to get a better solution for the parameters. An example of adjusting the process model may include changing the changing the process model currently employed by the process controller 155 (e.g., y=ax+b), to another process model (e.g., $y=cx^2+dx+e$), if the current process model is unable to control the process operation 102 as desired. In the above exemplary process models, y is the process output, and x is the process state.

In FIG. 3, the PMA module 185 determines (at 310) if the performance index (determined at block 225) is greater than a first preselected threshold value, and, if so, the PMA module 185 indicates to the dispatch module 114 to increase (at 315) the sampling frequency. An increase in the sampling frequency may be desired because a performance index higher than the first preselected threshold may indicate that the process result is not within an acceptable range of the target value, and thus more measurements are needed to adjust the process model or parameters. In one embodiment, the PMA module 185, depending on the magnitude of the performance index, may indicate to the dispatch module 114 the new sampling frequency that is desired. It should be understood that the particular value assigned to the first preselected threshold value will depend on the particular implementation. In an alternative embodiment, the PMA module 185 may not provide an indication to increase the sampling frequency until a plurality of performance indices are determined to be greater than the first preselected threshold value. That is, the sampling frequency is increased only after several consecutive performance indices (associated with several process runs) are higher than the first threshold value.

If the performance index is not greater than the first preselected threshold value (at 310), then the PMA module 185 determines (at 320) if the performance index is less than a second preselected threshold value. If the performance index is less than the second preselected threshold value, then the PMA module 185, in one embodiment, indicates (at 330) to the dispatch module 114 to decrease the sampling frequency. A decrease in the sampling frequency may be desired because a performance index lower than the second preselected threshold can indicate that the process result is within an acceptable range of the target result, and thus the number of measurements needed may be reduced because the current process model is controlling the process as desired. In an alternative embodiment, the PMA module 185 may not provide an indication to lower the sampling frequency until a plurality of performance indices are determined to be less than the second preselected threshold value. That is, the sampling frequency is lowered only after several consecutive performance indices (associated with several process runs) are lower than the second threshold value. In one embodiment, the PMA module 185, depending on the magnitude of the performance index, may indicate to the dispatch module 114 the new sampling frequency that is desired. The particular value chosen for the second preselected threshold value will depend on the particular implementation.

If the performance index is not greater than the first preselected threshold value and is not less than the second preselected threshold value, then, in the illustrated embodiment, the PMA module 185 may indicate to the dispatch module 114 that no change in the sampling frequency is desired (at 335). In an alternative embodiment, if it is determined that no change is desired in the sampling frequency, the PMA module 185 may provide no indication to the dispatch module 114, thereby indicating that the previous sampling frequency (or some predefined default sampling frequency) should be applied.

One or more embodiments of the present invention adjusts the sampling protocol as needed based on the performance index to adjust a process model or parameters in an adaptive industrial process. For example, the sampling rate may be increased if a relatively large performance index is determined or it may be lowered if a relatively small performance index is determined. In other instances, the sampling protocol may not be altered if the determined performance index is neither relatively large nor small. By adjusting the sampling protocol as desired, an efficient and effective way of controlling the process to achieve the desired objectives is provided.

The various system layers, routines, or modules may be executable by the control unit 156 (see FIG. 1). As utilized herein, the term "control unit" may include a microprocessor, a microcontroller, a digital signal processor, a processor card (including one or more microprocessors or controllers), or other control or computing devices. The storage unit 157 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   determining a performance valued based on a measurement associated with at least one or more previously processed workpieces;
   adjusting a sampling protocol for one or more processed workpieces based on the determined performance value;

measuring the one or more processed workpieces according to the sampling protocol to provide one or more measurements; and adjusting at least one of a process model and a control parameter based on at least a portion of the one or more measurements.

2. The method of claim 1, wherein measuring the one or more processed workpieces comprises measuring one or more processed semiconductor wafers.

3. The method of claim 1, wherein determining the performance value comprises determining a difference between a target result and a measured process result, wherein the measured process result is based on at least a portion of the measurements associated with the previously processed workpieces.

4. The method of claim 1, wherein adjusting the sampling protocol comprises adjusting at least one of a number of the processed workpieces to be measured, a number of features formed on the processed workpieces that are to be measured, and a type of features to be measured.

5. The method of claim 4, wherein adjusting the number of processed workpieces comprises increasing the number of processed workpieces that are to be measured if the performance value is greater than a preselected threshold value.

6. The method of claim 5, further comprising determining the performance value for each of a plurality of process runs, and wherein adjusting the number of processed workpieces comprises increasing the number of processed workpieces that are to be measured if the performance value for each of the plurality of process runs is greater than the preselected threshold value.

7. The method of claim 4, wherein adjusting the number of processed workpieces comprises decreasing the number of processed workpieces that are to be measured if the performance value is less than a preselected threshold value.

8. The method of claim 7, further comprising determining the performance value for each of a plurality of process runs, and wherein adjusting the number of processed workpieces comprises decreasing the number of processed workpieces that are to be measured if the performance value for each of the plurality of process runs is less than the preselected threshold value.

9. The method of claim 1, wherein adjusting the number of the processed workpieces that are to be measured comprises adjusting the number of processed workpieces that are to b measured for each process ran and wherein measuring the one or more processed workpieces according to the sampling protocol comprises measuring at least one feature formed on the one or more of the processed workpieces.

10. An apparatus comprising:
an interface adapted to receive a measurement associated with one or more previously processed workpieces; and
a control unit communicatively coupled to the interface, the control unit adapted to:
determine a performance value based on the measurement associated with at least one or more of the previously processed workpieces;
adjusting a sampling protocol for one or more processed workpieces based on the determined performance value;
receive metrology data comprising measurements of the one or more processed workpieces according to the sampling protocol; and
adjust at least one of a process model and a control parameter based on at least a portion of the metrology data.

11. The apparatus of claim 10, wherein the one or more processed workpieces comprise one or more semiconductor wafers, and wherein the control unit is adapted to process the one or more semiconductor wafers and receive metrology data associated with the measurements of the one or more semiconductor wafers.

12. The apparatus of claim 10, wherein the control unit is adapted to determine a difference between a target result and a measured process result, wherein the measured process result is based on at least a portion of the measurements associated with the previously processed workpieces.

13. The apparatus of claim 12, wherein the control unit is adapted to adjust at least one of a number of the processed workpieces to be measured, a number of features formed On the processed workpieces that are to be measured, and a type of features to be measured.

14. The apparatus of claim 13, wherein the control unit is adapted to increase the number of processed workpieces that are to be measured if the performance value is greater than a preselected threshold value.

15. The apparatus of claim 14, wherein the control unit is further adapted to determined the performance value for each of a plurality of process runs, and wherein the control unit is adapted to increase the number of processed workpieces that are to be measured if the performance value for each of the plurality of process runs is greater than the preselected threshold value.

16. The apparatus of claim 13, wherein the control unit is adapted to decrease the number of processed workpieces that are to be measured if the performance value is less than a preselected threshold value.

17. The apparatus of claim 16, wherein the control unit is farther adapted to determine the performance value for each of a plurality of process runs, and wherein the control unit is adapted to decrease the number of processed workpieces that are to be measured if the performance value for each of the plurality of process runs is less than the preselected threshold value.

18. The apparatus of claim 10, wherein the control unit is adapted to adjust the number of the processed workpieces that are to b measured comprises adjusting the number of processed workpieces that are to be measured for each process run and wherein the control unit is adapted to measure the one or more processed workpieces according to the sampling protocol comprises measuring at least one feature formed on the one or more of the processed workpieces.

19. An apparatus comprising:
means for determining a performance value based on a measurement associated with at least one or more previously processed workpieces;
means for adjusting a sampling protocol for one or more processed workpieces based on the determined performance value;
means for measuring the one or more processed workpieces according to the adjusted sampling protocol to provide one or more measurements; and
means for adjusting at least one or a process model and a control parameter based on at least a portion of the one or more measurements.

20. An article comprising one or more machine-readable storage media containing instructions that when executed enable a processor to:
determine a performance value based on a measurement associated with at least one or more previously processed workpieces;

adjust a sampling protocol for one or more processed workpieces based on the determined performance value;

receive one or more measurements associated with the one or more processed workpieces, wherein the one or more workpieces are measured according to the adjusted sampling protocol; and adjust at least one of a process model and a control parameter based on at least a portion of the one or more measurements.

21. The article of claim 20, wherein the instructions when executed enable the processor to determine a difference between a target result and a measured process result, wherein the measured result is based on at least a portion of the measurements associated with the previously processed workpieces.

22. The article of claim 21, wherein the instructions when executed enable the processor to adjust at least one of a number of the processed workpieces to be measured, a number of features formed on the processed workpieces that are to be measured, and a type of features to be measured.

23. The article of claim 22, wherein the instructions when executed enable the processor to increase the number of processed workpieces that are to be measured if the performance value is greater than a preselected threshold value.

24. The article of claim 22, wherein the instructions when executed enable the processor to decrease the number of processed workpieces that are to be measured if the performance value is less than a preselected threshold value.

25. The article of claim 23, wherein the instructions when executed enable the processor to adjust the number of processed workpieces that are to be measured for each process run.

26. A system, comprising:
a dispatch module;
a controller adapted to:
  determine a performance value based on a measurement associated with at least one or more previously processed workpieces;
  adjust a sampling protocol of the dispatch module for one or more processed workpieces based on the determined performance value;
  measure the one or more processed workpieces according to the adjusted sampling protocol to provide one or more measurements; and
  adjust at least one of a process model and a control parameter based on at least a portion of the one or more measurements.

27. The system of claim 26, wherein the controller is implemented within an advanced control process framework.

* * * * *

UNITED STATES PATENT AND TRADEMARK OFFICE
CERTIFICATE OF CORRECTION

PATENT NO. : 7,050,879 B1  Page 1 of 1
APPLICATION NO. : 10/406463
DATED : May 23, 2006
INVENTOR(S) : Jin Wang and Gregory A. Cherry It is certified that error appears in the above-identified patent and that said Letters Patent is hereby corrected as shown below:

Claim 9: Column 11, line 46 change "b" to --be-- and "ran" to --run-- on the same line;

Claim 13: Column 12, line 14, change "On" to --on--;

Claim 17: Column 12, line 33, change "farther" to --further--.

Signed and Sealed this

Fifth Day of June, 2007

JON W. DUDAS
*Director of the United States Patent and Trademark Office*